US009503494B2

(12) United States Patent
Galligan

(10) Patent No.: US 9,503,494 B2
(45) Date of Patent: Nov. 22, 2016

(54) ADAPTIVE STREAMING USING CHUNKED TIME-TO-OFFSET MAPPING

(71) Applicant: Google Inc., Mountain View, CA (US)

(72) Inventor: Frank William Galligan, Clifton Park, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/954,718

(22) Filed: Nov. 30, 2015

(65) Prior Publication Data

US 2016/0094604 A1    Mar. 31, 2016

Related U.S. Application Data

(62) Division of application No. 13/484,150, filed on May 30, 2012, now Pat. No. 9,241,170.

(60) Provisional application No. 61/588,140, filed on Jan. 18, 2012.

(51) Int. Cl.
*H04N 7/30* (2006.01)
*H04L 29/06* (2006.01)
*H04N 19/50* (2014.01)

(52) U.S. Cl.
CPC ........... *H04L 65/601* (2013.01); *H04L 65/607* (2013.01); *H04N 19/50* (2014.11)

(58) Field of Classification Search
CPC ...... H04N 7/26244; H04N 7/30; H04N 7/50; H04N 7/26085; H04N 7/26106
See application file for complete search history.

(56) References Cited

U.S. PATENT DOCUMENTS

| 2011/0082924 A1* | 4/2011 | Gopalakrishnan .. H04L 65/4084 709/223 |
| 2012/0271920 A1* | 10/2012 | Isaksson ............. H04L 47/2416 709/219 |
| 2013/0018855 A1* | 1/2013 | Eshghi ................ G06F 11/1453 707/692 |

OTHER PUBLICATIONS

"Improving the Internet TV and Mobile Video Experience: An Adaptive Streaming Overview," White paper, 2010, 5 pages, Digital Rapids Corporation.
Romero, "A Dynamic Adaptive HTTP Streaming Video Service for Google Android," Oct. 6, 2011, 148 pages.
Watson, "Adaptive HTTP streaming and HTML5," W3C Web and TV Workshop, Feb. 8-9, 2011, 6 pages.

* cited by examiner

*Primary Examiner* — Dave Czekaj
*Assistant Examiner* — Nam Pham
(74) *Attorney, Agent, or Firm* — Fenwick & West LLP

(57) ABSTRACT

Systems and methods are provided herein relating to adaptive video streaming. Time-to-offset mapping associated with a set of video blocks can be broken up into chunks. A client can download a first set of seek index chunks and use the first set of seek index chunks to select a stream. Seek index chunks within remaining sets of seek index chunks can be ranked for relevance based on client capabilities. A subset of remaining sets of seeks index chunks can be downloaded based on the rankings and client capabilities during streaming. Chunked time-to-offset mapping can facilitate faster startup when playing streamed video.

12 Claims, 17 Drawing Sheets

| Index | Bytes | 250 Kbps | 500 Kbps | 750 Kbps | 1000 Kbps |
|---|---|---|---|---|---|
| Video 1 - Header | 438 | 0.014 | 0.007 | 0.005 | 0.004 |
| Video 1 - Index | 77275 | 2.473 | 1.236 | 0.824 | 0.618 |
| Video 2 - Header | 438 | 0.014 | 0.007 | 0.005 | 0.004 |
| Video 2 - Index | 76722 | 2.455 | 1.228 | 0.818 | 0.614 |
| Video 3 - Header | 440 | 0.014 | 0.007 | 0.005 | 0.004 |
| Video 3 - Index | 76649 | 2.453 | 1.226 | 0.818 | 0.613 |
| Video 4 - Header | 440 | 0.014 | 0.007 | 0.005 | 0.004 |
| Video 4 - Index | 76649 | 2.453 | 1.226 | 0.818 | 0.613 |
| Audio 1 - Header | 3534 | 0.113 | 0.057 | 0.038 | 0.028 |
| Audio 1 - Index | 14233 | 0.455 | 0.228 | 0.152 | 0.114 |
| Audio 2 - Header | 3739 | 0.120 | 0.060 | 0.040 | 0.030 |
| Audio 2 - Index | 14233 | 0.455 | 0.228 | 0.152 | 0.114 |
| Total Time in Seconds | | 11.033 | 5.517 | 3.678 | 2.758 |

FIG. 3A

| Index | Bytes | 250 Kbps | 500 Kbps | 750 Kbps | 1000 Kbps |
|---|---|---|---|---|---|
| Video 1 - Header | 438 | 0.014 | 0.007 | 0.005 | 0.004 |
| Video 1 - Index | 10826 | 0.346 | 0.173 | 0.115 | 0.087 |
| Video 2 - Header | 438 | 0.014 | 0.007 | 0.005 | 0.004 |
| Video 2 - Index | 10826 | 0.346 | 0.173 | 0.115 | 0.087 |
| Video 3 - Header | 440 | 0.014 | 0.007 | 0.005 | 0.004 |
| Video 3 - Index | 10790 | 0.345 | 0.173 | 0.115 | 0.086 |
| Video 4 - Header | 440 | 0.014 | 0.007 | 0.005 | 0.004 |
| Video 4 - Index | 10790 | 0.345 | 0.173 | 0.115 | 0.086 |
| Audio 1 - Header | 3534 | 0.113 | 0.057 | 0.038 | 0.028 |
| Audio 1 - Index | 2033 | 0.065 | 0.033 | 0.022 | 0.016 |
| Audio 2 - Header | 3739 | 0.120 | 0.060 | 0.040 | 0.030 |
| Audio 2 - Index | 2033 | 0.065 | 0.033 | 0.022 | 0.016 |
| Total Time in Seconds | | 1.802 | 0.901 | 0.601 | 0.451 |

FIG. 3B

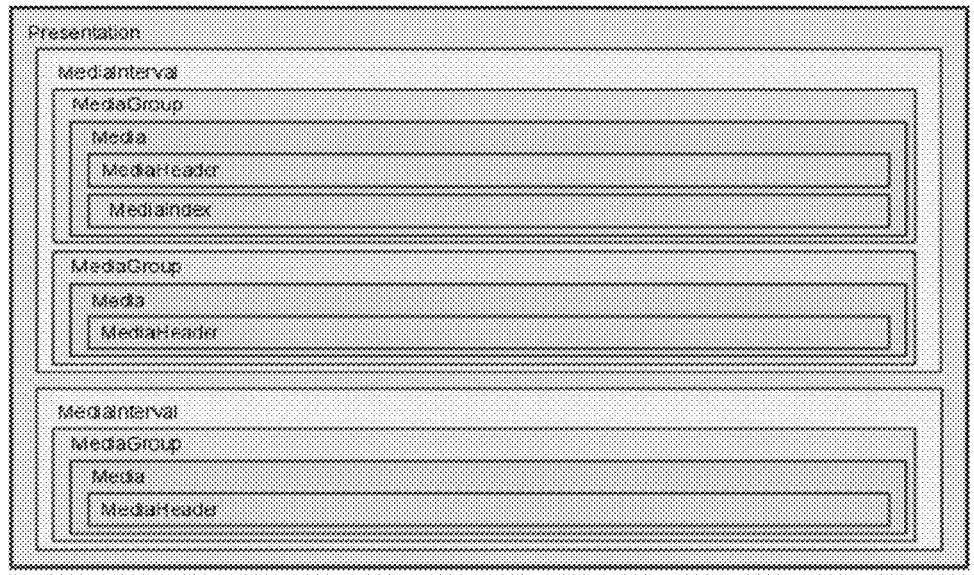

FIG. 4A

```
<?xml version="1.0" encoding="UTF-8"?>
<Presentation duration="888.06">
    <MediaInterval start="0.0" duration="888.06" >
        <MediaGroup id="0" type="video/webm; codecs=vp8" alignment="true" >
            <Media id="0" bandwidth="883" url="vid_1.webm" width="720" height="306" >
                <MediaHeader url="vid_1.webm" range="0-307" />
                <MediaIndex url="vid_1.webm" range="97952976-97969236"
                    base_seek_pos="55" />
            </Media>
            <Media id="1" bandwidth="2093" url="vid_2.webm" width="720" height="306" >
                <MediaHeader url="vid_2.webm" range="0-445" />
                <MediaIndex url="vid_2.webm" range="232079131-232084802"
                    base_seek_pos="55" />
            </Media>
        </MediaGroup>
        <MediaGroup id="1" type="video/webm; codecs=vorbis" lang="eng" alignment="true" >
            <Media id="4" bandwidth="102" url="aud.webm" channels="2"
                samplerate="44100" >
                <MediaHeader url="aud.webm" range="0-4380" />
                <MediaIndex url="aud.webm" range="14321026-14335259"
                    base_seek_pos="48" />
            </Media>
        </MediaGroup>
    </MediaInterval>
</Presentation>
```

FIG. 4B

```xml
<?xml version="1.0" encoding="UTF-8"?>
<Presentation duration="4199.98" version="1" >
<MediaInterval id="0" start="0" duration="4199.98" >
<MediaGroup id="0" mimetype="video/webm; codecs=vp8" alignment="true" >
<Media id="0" bandwidth="252" width="640" height="480" url="vid_1.webm" >
<MediaHeader url="vid_1.webm" range="0-438" />
<MediaIndex url="vid_1.webm" range="132432378-132509653" base_seek_pos="55" />
</Media>
<Media id="1" bandwidth="502" width="640" height="480" url="vid_2.webm" >
<MediaHeader url="vid_2.webm" range="0-438" />
<MediaIndex url="vid_2.webm" range="263597994-263674716" base_seek_pos="55" />
</Media>
<Media id="2" bandwidth="752" width="640" height="480" url="vid_3.webm" >
<MediaHeader url="vid_3.webm" range="0-440" />
<MediaIndex url="vid_3.webm" range="394816954-394893603" base_seek_pos="55" />
</Media>
<Media id="3" bandwidth="1002" width="640" height="480" url="vid_4.webm" >
<MediaHeader url="vid_4.webm" range="0-440" />
<MediaIndex url="vid_4.webm" range="526035667-526112316" base_seek_pos="55" />
</Media>
</MediaGroup>
<MediaGroup id="1" mimetype="video/webm; codecs=vorbis" lang="eng" >
<Media id="11" bandwidth="27" url="aud_1.webm" channels="2" samplerate="44100" >
<MediaHeader url="aud_1.webm" range="0-3534" />
<MediaIndex url="aud_1.webm" range="14321026-14335259" base_seek_pos="48" />
</Media>
</MediaGroup>
<MediaGroup id="2" mimetype="video/webm; codecs=vorbis" lang="spa" >
<Media id="12" bandwidth="27" url="aud_2.webm" channels="2" samplerate="44100" >
<MediaHeader url="aud_2.webm" range="0-3739" />
<MediaIndex url="aud_2.webm" range="14321422-14335655" base_seek_pos="48" />
</Media>
</MediaGroup>
</MediaInterval>
</Presentation>
```

FIG. 4C

Page 1

```xml
<?xml version="1.0" encoding="UTF-8"?>
<Presentation duration="4199.98" version="1" >
<MediaInterval id="0" start="0" duration="4199.98" >
<MediaGroup id="0" mimetype="video/webm; codecs=vp8" alignment="true" >
<Media id="0" bandwidth="252" width="640" height="480" url="vid_1.webm" >
<MediaHeader url="vid_1.webm" range="0-438" />
<MediaIndex url="vid_1.webm" base_seek_pos="55" >
<IndexChunk start="0.000" end="600.066" range="132433278-132443204" />
<IndexChunk start="600.066" end="1201.000" range="132443204-132454040" />
<IndexChunk start="1201.000" end="1801.000" range="132454040-132464840" />
<IndexChunk start="1801.000" end="2401.000" range="132464840-132475909" />
<IndexChunk start="2401.000" end="3001.000" range="132475909-132487120" />
<IndexChunk start="3001.000" end="3601.066" range="132487120-132498257" />
<IndexChunk start="3601.066" end="4199.966" range="132498257-132509653" />
</MediaIndex>
</Media>
<Media id="1" bandwidth="502" width="640" height="480" url="vid_2.webm" >
<MediaHeader url="vid_2.webm" range="0-438" />
<MediaIndex url="vid_2.webm" base_seek_pos="55" >
<IndexChunk start="0.000" end="600.066" range="263597994-263608820" />
<IndexChunk start="600.066" end="1200.066" range="263608820-263619620" />
<IndexChunk start="1200.066" end="1801.000" range="263619620-263630456" />
<IndexChunk start="1801.000" end="2401.000" range="263630456-263641416" />
<IndexChunk start="2401.000" end="3001.000" range="263641416-263652516" />
<IndexChunk start="3001.000" end="3601.000" range="263652516-263663516" />
<IndexChunk start="3601.000" end="4199.966" range="263663516-263674716" />
</MediaIndex>
</Media>
<Media id="2" bandwidth="752" width="640" height="480" url="vid_3.webm" >
<MediaHeader url="vid_3.webm" range="0-440" />
<MediaIndex url="vid_3.webm" base_seek_pos="55" >
<IndexChunk start="0.000" end="500.000" range="394816954-394827744" />
<IndexChunk start="600.000" end="1200.000" range="394827744-394838544" />
<IndexChunk start="1200.000" end="1800.000" range="394838544-394849344" />
<IndexChunk start="1800.000" end="2400.000" range="394849344-394860303" />
<IndexChunk start="2400.000" end="3000.000" range="394860303-394871403" />
<IndexChunk start="3000.000" end="3600.000" range="394871403-394882503" />
<IndexChunk start="3600.000" end="4199.966" range="394882503-394893603" />
</MediaIndex>
</Media>
```

Page 2

```xml
<Media id="3" bandwidth="1002" width="640" height="480" url="vid_4.webm" >
<MediaHeader url="vid_4.webm" range="0-440" />
<MediaIndex url="vid_4.webm" base_seek_pos="55" >
<IndexChunk start="0.000" end="600.000" range="526035667-526046457" />
<IndexChunk start="600.000" end="1200.000" range="526046457-526057257" />
<IndexChunk start="1200.000" end="1800.000" range="526057257-526068057" />
<IndexChunk start="1800.000" end="2400.000" range="526068057-526079016" />
<IndexChunk start="2400.000" end="3000.000" range="526079016-526090116" />
<IndexChunk start="3000.000" end="3600.000" range="526090116-526101216" />
<IndexChunk start="3600.000" end="4199.966" range="526101216-526112316" />
</MediaIndex>
</Media>
</MediaGroup>
<MediaGroup id="1" mimetype="video/webm; codecs=vorbis" lang="eng" >
<Media id="11" bandwidth="27" url="aud_1.webm" channels="2" samplerate="44100" >
<MediaHeader url="aud_1.webm" range="0-3534" />
<MediaIndex url="aud_1.webm" base_seek_pos="48" >
<IndexChunk start="0.000" end="600.770" range="14321026-14323059" />
<IndexChunk start="600.770" end="1201.540" range="14323059-14325092" />
<IndexChunk start="1201.540" end="1802.285" range="14325092-14327125" />
<IndexChunk start="1802.286" end="2403.010" range="14327125-14329158" />
<IndexChunk start="2403.010" end="3003.780" range="14329158-14331191" />
<IndexChunk start="3003.780" end="3604.526" range="14331191-14333224" />
<IndexChunk start="3604.526" end="4200.002" range="14333224-14335259" />
</MediaIndex>
</Media>
</MediaGroup>
<MediaGroup id="2" mimetype="video/webm; codecs=vorbis" lang="spa" >
<Media id="12" bandwidth="27" url="aud_2.webm" channels="2" samplerate="44100" >
<MediaHeader url="aud_2.webm" range="0-3739" />
<MediaIndex url="aud_2.webm" base_seek_pos="48" >
<IndexChunk start="0.000" end="600.770" range="14321422-14323455" />
<IndexChunk start="600.770" end="1201.540" range="14323455-14325488" />
<IndexChunk start="1201.540" end="1802.286" range="14325488-14327521" />
<IndexChunk start="1802.286" end="2403.010" range="14327521-14329554" />
<IndexChunk start="2403.010" end="3003.780" range="14329554-14331587" />
<IndexChunk start="3003.780" end="3604.526" range="14331587-14333620" />
<IndexChunk start="3604.526" end="4200.002" range="14333620-14335655" />
</MediaIndex>
</Media>
</MediaGroup>
</MediaInterval>
</Presentation>
```

Page 1

```xml
<?xml version="1.0" encoding="UTF-8"?>
<Presentation duration="4199.98" version="1" >
<MediaInterval id="0" start="0" duration="4199.98" >
<MediaGroup id="0" mimetype="video/webm; codecs=vp8" alignment="true" >
<Media id="0" bandwidth="252" width="640" height="480" url="vid_1.webm" >
<MediaHeader url="vid_1.webm" range="0-438" />
<MediaIndex url="vid_1.webm" base_seek_pos="55" >
<IndexChunk start="0.000" end="600.066" range="132432378-132443204" />
<IndexChunk start="600.066" end="1201.000" range="132443204-132454040" />
<IndexChunk start="1201.000" end="1801.000" range="132454040-132464840" />
<IndexChunk start="1801.000" end="2401.000" range="132464840-132475909" />
<IndexChunk start="2401.000" end="3001.000" range="132475909-132487120" />
<IndexChunk start="3001.000" end="3601.066" range="132487120-132498257" />
<IndexChunk start="3601.066" end="4199.966" range="132498257-132509653" />
</MediaIndex>
</Media>
<Media id="1" bandwidth="640" width="640" height="480" url="vid_2.webm" >
<MediaHeader url="vid_2.webm" range="0-438" />
<MediaIndex url="vid_2.webm" base_seek_pos="55" >
<IndexChunk start="0.000" end="600.066" range="263597994-263608820" />
<IndexChunk start="600.066" end="1200.066" range="263608820-263619620" />
<IndexChunk start="1200.066" end="1801.000" range="263619620-263630456" />
<IndexChunk start="1801.000" end="2401.000" range="263630456-263641416" />
<IndexChunk start="2401.000" end="3001.000" range="263641416-263652516" />
<IndexChunk start="3001.000" end="3601.000" range="263652516-263663616" />
<IndexChunk start="3601.000" end="4199.966" range="263663616-263674716" />
</MediaIndex>
</Media>
<Media id="2" bandwidth="752" width="640" height="480" url="vid_3.webm" >
<MediaHeader url="vid_3.webm" range="0-440" />
<MediaIndex url="vid_3.webm" base_seek_pos="55" >
<IndexChunk start="0.000" end="600.000" range="394816954-394827744" />
<IndexChunk start="600.000" end="1200.000" range="394827744-394838544" />
<IndexChunk start="1200.000" end="1800.000" range="394838544-394849344" />
<IndexChunk start="1800.000" end="2400.000" range="394849344-394860303" />
<IndexChunk start="2400.000" end="3000.000" range="394860303-394871403" />
<IndexChunk start="3000.000" end="3600.000" range="394871403-394882503" />
<IndexChunk start="3600.000" end="4199.966" range="394882503-394893603" />
</MediaIndex>
</Media>
```

Page 2

```xml
<Media id="3" bandwidth="1002" width="640" height="480" url="vid_4.webm" >
<MediaHeader url="vid_4.webm" range="0-440" />
<MediaIndex url="vid_4.webm" base_seek_pos="55" >
<IndexChunk start="0.000" end="600.000" range="526035667-526046457" />
<IndexChunk start="600.000" end="1200.000" range="526046457-526057257" />
<IndexChunk start="1200.000" end="1800.000" range="526057257-526068057" />
<IndexChunk start="1800.000" end="2400.000" range="526068057-526079016" />
<IndexChunk start="2400.000" end="3000.000" range="526079016-526090116" />
<IndexChunk start="3000.000" end="3600.000" range="526090116-526101216" />
<IndexChunk start="3600.000" end="4199.966" range="526101216-526112316" />
</MediaIndex>
</Media>
</MediaGroup>
<MediaGroup id="1" mimetype="video/webm; codecs=vorbis" lang="eng" >
<Media id="11" bandwidth="27" url="aud_1.webm" channels="2" samplerate="44100" >
<MediaHeader url="aud_1.webm" range="0-3534" />
<MediaIndex url="aud_1.webm" base_seek_pos="48" >
<IndexChunk start="0.000" end="600.770" range="14321026-14323059" />
<IndexChunk start="600.770" end="1201.540" range="14323059-14325092" />
<IndexChunk start="1201.540" end="1802.286" range="14325092-14327125" />
<IndexChunk start="1802.286" end="2403.010" range="14327125-14329158" />
<IndexChunk start="2403.010" end="3003.780" range="14329158-14331191" />
<IndexChunk start="3003.780" end="3604.526" range="14331191-14333224" />
<IndexChunk start="3604.526" end="4200.002" range="14333224-14335259" />
</MediaIndex>
</Media>
</MediaGroup>
<MediaGroup id="2" mimetype="video/webm; codecs=vorbis" lang="spa" >
<Media id="12" bandwidth="27" url="aud_2.webm" channels="2" samplerate="44100" >
<MediaHeader url="aud_2.webm" range="0-3739" />
<MediaIndex url="aud_2.webm" base_seek_pos="48" >
<IndexChunk start="0.000" end="600.770" range="14321422-14323455" />
<IndexChunk start="600.770" end="1201.540" range="14323455-14325488" />
<IndexChunk start="1201.540" end="1802.286" range="14325488-14327521" />
<IndexChunk start="1802.286" end="2403.010" range="14327521-14329554" />
<IndexChunk start="2403.010" end="3003.780" range="14329554-14331587" />
<IndexChunk start="3003.780" end="3604.526" range="14331587-14333620" />
<IndexChunk start="3604.526" end="4200.002" range="14333620-14335655" />
</MediaIndex>
</Media>
</MediaGroup>
</MediaInterval>
</Presentation>
```

FIG. 5D

Page 1

```xml
<?xml version="1.0" encoding="UTF-8"?>
<Presentation duration="4199.98" version="1" >
<MediaInterval id="0" start="0" duration="4199.98" >
<MediaGroup id="0" mimetype="video/webm; codecs=vp8" alignment="true" >
<Media id="0" bandwidth="252" width="640" height="480" url="vid_1.webm" >
<MediaHeader url="vid_1.webm" range="0-438" />
<MediaIndex url="vid_1.webm" base_seek_pos="55" >
<IndexChunk start="0.000" end="600.066" range="132432378-132443204" />
<IndexChunk start="600.066" end="1201.000" range="132443204-132454040" />
<IndexChunk start="1201.000" end="1801.000" range="132454040-132464840" />
<IndexChunk start="1801.000" end="2401.000" range="132464840-132475909" />
<IndexChunk start="2401.000" end="3001.000" range="132475909-132487120" />
<IndexChunk start="3001.000" end="3601.066" range="132487120-132498257" />
<IndexChunk start="3601.066" end="4199.966" range="132498257-132509653" />
</MediaIndex>
</Media>
<Media id="1" bandwidth="502" width="640" height="480" url="vid_2.webm" >
<MediaHeader url="vid_2.webm" range="0-438" />
<MediaIndex url="vid_2.webm" base_seek_pos="55" >
<IndexChunk start="0.000" end="600.066" range="263597994-263608820" />
<IndexChunk start="600.066" end="1200.066" range="263608820-263619620" />
<IndexChunk start="1200.066" end="1801.000" range="263619620-263630456" />
<IndexChunk start="1801.000" end="2401.000" range="263630456-263641416" />
<IndexChunk start="2401.000" end="3001.000" range="263641416-263652516" />
<IndexChunk start="3001.000" end="3601.000" range="263652516-263663616" />
<IndexChunk start="3601.000" end="4199.966" range="263663616-263674716" />
</MediaIndex>
</Media>
<Media id="2" bandwidth="752" width="640" height="480" url="vid_3.webm" >
<MediaHeader url="vid_3.webm" range="0-440" />
<MediaIndex url="vid_3.webm" base_seek_pos="55" >
<IndexChunk start="0.000" end="600.000" range="394816954-394827744" />
<IndexChunk start="600.000" end="1200.000" range="394827744-394838544" />
<IndexChunk start="1200.000" end="1800.000" range="394838544-394849344" />
<IndexChunk start="1800.000" end="2400.000" range="394849344-394860303" />
<IndexChunk start="2400.000" end="3000.000" range="394860303-394871403" />
<IndexChunk start="3000.000" end="3600.000" range="394871403-394882503" />
<IndexChunk start="3600.000" end="4199.966" range="394882503-394893603" />
</MediaIndex>
</Media>
```

Page 2

```xml
<Media id="3" bandwidth="1002" width="640" height="480" url="vid_4.webm" >
<MediaHeader url="vid_4.webm" range="0-440" />
<MediaIndex url="vid_4.webm" base_seek_pos="55" >
<IndexChunk start="0.000" end="600.000" range="526035667-52604645 7" />
<IndexChunk start="600.000" end="1200.000" range="526046457-52605725 7" />
<IndexChunk start="1200.000" end="1800.000" range="526057257-526068057" />
<IndexChunk start="1800.000" end="2400.000" range="526068057-526079016" />
<IndexChunk start="2400.000" end="3000.000" range="526079016-526090116" />
<IndexChunk start="3000.000" end="3600.000" range="526090116-526101216" />
<IndexChunk start="3600.000" end="4199.966" range="526101216-526112316" />
</MediaIndex>
</Media>
</MediaGroup>
<MediaGroup id="1" mimetype="video/webm; codecs=vorbis" lang="eng" >
<Media id="11" bandwidth="27" url="aud_1.webm" channels="2" samplerate="44100" >
<MediaHeader url="aud_1.webm" range="0-3534" />
<MediaIndex url="aud_1.webm" base_seek_pos="48" >
<IndexChunk start="0.000" end="600.770" range="14321026-14323059" />
<IndexChunk start="600.770" end="1201.540" range="14323059-14325092" />
<IndexChunk start="1201.540" end="1802.286" range="14325092-14327125" />
<IndexChunk start="1802.286" end="2403.010" range="14327125-14329158" />
<IndexChunk start="2403.010" end="3003.780" range="14329158-14331191" />
<IndexChunk start="3003.780" end="3604.526" range="14331191-14333224" />
<IndexChunk start="3604.526" end="4200.002" range="14333224-14335259" />
</MediaIndex>
</Media>
</MediaGroup>
<MediaGroup id="2" mimetype="video/webm; codecs=vorbis" lang="spa" >
<Media id="12" bandwidth="27" url="aud_2.webm" channels="2" samplerate="44100" >
<MediaHeader url="aud_2.webm" range="0-3739" />
<MediaIndex url="aud_2.webm" base_seek_pos="48" >
<IndexChunk start="0.000" end="600.770" range="14321422-14323455" />
<IndexChunk start="600.770" end="1201.540" range="14323455-14325488" />
<IndexChunk start="1201.540" end="1802.286" range="14325488-14327521" />
<IndexChunk start="1802.286" end="2403.010" range="14327521-14329554" />
<IndexChunk start="2403.010" end="3003.780" range="14329554-14331587" />
<IndexChunk start="3003.780" end="3604.526" range="14331587-14333620" />
<IndexChunk start="3604.526" end="4200.002" range="14333620-14335655" />
</MediaIndex>
</Media>
</MediaGroup>
</MediaInterval>
</Presentation>
```

ADAPTIVE STREAMING USING CHUNKED TIME-TO-OFFSET MAPPING

CROSS-REFERENCE TO RELATED APPLICATIONS

This application is a divisional of and claims the benefit of U.S. application Ser. No. 13/484,150, entitled "Adaptive Streaming Using Chunked Time-to-Offset Mapping" filed on May 30, 2012, which claims the benefit of U.S. provisional application 61/588,140, entitled "Adaptive Streaming Using Chunked Time-to-Offset Mapping" filed on Jan. 28, 2012, each of which is hereby incorporated herein by reference in the respective entirety of each.

TECHNICAL FIELD

This application relates to adaptive video streaming, and more particularly to using a chunked time-to-offset mapping to reduce streaming startup/load times.

BACKGROUND

Videos hosted on the internet can be viewed on many commercially available electronic devices such as smart phones, tablets, e-readers, computers, personal digital assistants, personal media players, etc. One way to view a video is download the entirety of a video file and once complete, view the video file using video playing software installed on the electronic device. For long videos or high definition videos, downloading an entire video file can be time consuming and significantly delay a user from beginning to watch the video. One way to begin viewing the video without having to first download the entire video is through video streaming. In video streaming, portions of the video file can be provided piecemeal allowing the end user to begin playback of the video prior to having downloaded the entire video.

One method of video streaming is adaptive streaming. Adaptive streaming is a technique that can detect a user's connection speed to the internet, an available bandwidth, or CPU capacity and use those measurements to select the highest quality video stream that the user is capable of playing. One way to provide adaptive streaming is to host multiple video files of the same video that are capable of streaming, where the files are encoded using different bit rates, different frame rates, different resolutions, etc. A server or client device can then select the appropriate video file to stream based on the client. In addition, throughout playback of the video, if a user's connection speed for example changes, adaptive streaming provides for changing the stream the user is viewing to provide seamless playback under changing conditions. Thus, it can be important to know the bandwidth required for successful playback of each of the multiple video files prior to initially selecting a stream or during playback when switching streams under changing conditions.

A time-to-offset mapping, also known as a seek index, is typically used to identify seek points for a media file. In an adaptive streaming system, the time-to-offset mapping may also be used to facilitate switching seamlessly between different media files or streams associated with the same video. Typically, the time-to-offset mapping is part of a media file, located at the beginning or end of the media file. Conventionally, a client waits for a seek index to be fully downloaded before starting video play. In an adaptive streaming system, in which multiple media files are associated with a single video, waiting for all seek indices to be fully downloaded before starting video play can increase startup time associated with playing the video significantly.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to adaptive streaming. A receiving component can receive a first set of seek index chunks associated with a first set of video blocks, wherein the video blocks are encoded with different video characteristics. A streaming component can dynamically select to stream one of the video blocks among the first set of video blocks as a function of the first set of seek index chunks and client capabilities. A ranking component can rank index chunks within a second set of seek index chunks for relevance based on the client capabilities, wherein the receiving component can receive a subset of the second set of seek index chunks, during streaming, as a function of the ranking.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

FIG. 3A illustrates a chart depicting example download times of setup data for the media referred to in FIG. 4C;

FIG. 3B illustrates a chart depicting example download times of setup data for the media referred to in FIG. 5B in accordance with implementations of this disclosure;

FIG. 4A is a graphical representation of elements of an illustrative manifest;

FIG. 4B depicts a sample manifest in XML format consistent with the format described with respect to FIG. 4A;

FIG. 4C depicts another sample manifest in XML format consistent with the format described with respect to FIG. 4A;

FIG. 5B depicts a sample manifest in XML format consistent with the format described with respect to FIG. 5A;

FIG. 5C depicts the sample manifest of FIG. 5B, but with specific elements highlighted for ease of description;

FIG. 5D depicts the sample manifest of FIG. 5B, but with specific elements highlighted for ease of description;

DETAILED DESCRIPTION

Figure 1:
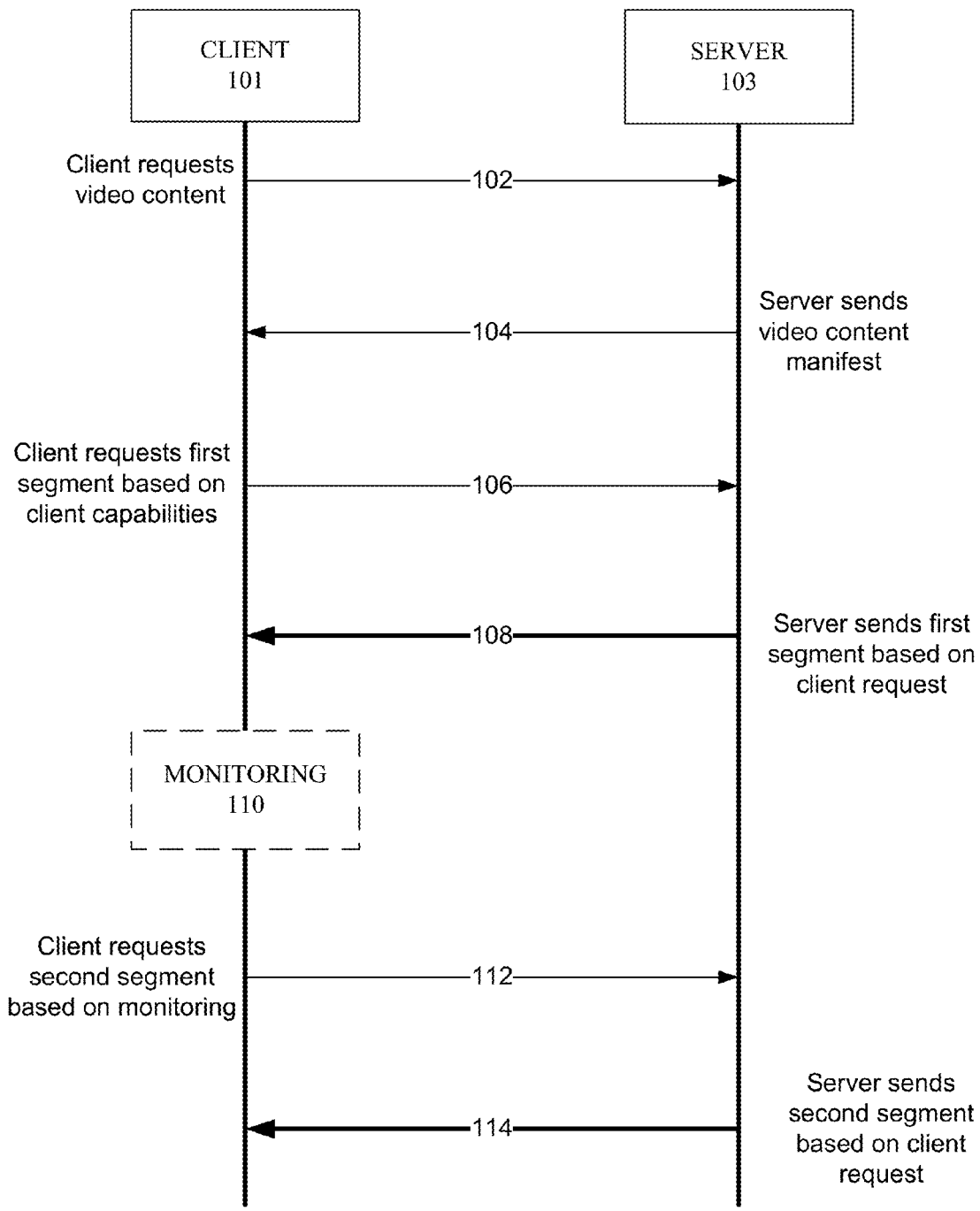
FIG. 1 illustrates an example flow diagram of adaptive streaming.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Adaptive streaming in general provides for encoding the same video content in at least two different versions where the different versions of the video are encoded with different video characteristics, such as, for example, at different bit rates. In addition to bit rate, different video characteristics of the video can include different aspect ratios, different resolutions, etc. In addition to different versions of the video, different audio tracks are capable of being streamed that include, for example, varying languages and/or varying sampling rates, etc. The server that hosts the video or the client, e.g., an electronic device capable of video playback, can monitor the connection speed, CPU usage, memory usage, etc. of the client in order to select a version of the video that both maximizes video quality and offers reliable playback.

One adaptive streaming delivery method uses the Hyper Text Transfer Protocol ("HTTP") to send video from a server to a client for playback. Other protocols that can be used are SPDY, WebSockets, or file transfer protocol ("FTP"). It can be appreciated that different protocols can be used to perform different aspects of the disclosed system and methods. Video and audio sources can be cut into manageable segments. The manageable segments can be the same length or alternatively can be differing lengths that are associated with a common shared timeline. The segments may be determined using Group of Pictures (GOP) boundaries where each GOP begins with a key frame so as to have no dependencies on past or future GOPs. A client can request manageable segments sequentially and use HTTP, for example, to download the segments both prior to and during streaming.

A time-to-offset mapping, or seek index, is typically used to identify seek points for a media file. In an adaptive streaming system, the time-to-offset mapping may also be used to facilitate switching seamlessly between different media files or streams associated with the same video. The adaptive streaming system can use the time-to-offset mapping to make stream switching decisions, for example. The time-to-offset mapping can also be used to estimate bandwidth requirements as described in U.S. patent application Ser. No. 13/484,112. Conventionally, a client waits for a time-to-offset mapping to be fully downloaded before starting video play. In an adaptive streaming system, in which multiple media files are associated a single video, waiting for all time-to-offset mappings to be fully downloaded before starting video play can increase the startup time associated with playing the video significantly. Systems and method described herein uses a chunked time-to-offset mapping, or chunked seek index, to reduce streaming startup/load times.

Referring to FIG. 1, there is illustrated an example flow diagram of adaptive streaming. Client 101 can be any electronic device capable of playing a video such as a smart phone, tablet, e-reader, computer, personal digital assistant, personal media player, etc. Client 101 can communicate with server 103 using HTTP, SPDY, WebSockets, FTP, etc. At 102, client 101 can request video content from server 103. For example, a user of client 101 can select a video they desire to view.

At 104, Server 103 can send a video content manifest to client 101 in response. The video content manifest can include information associated with the video that client 101 requested to view at 102. The video content manifest can include a list of different versions of video and audio files, streams or feeds of the video client 101 requested to view. For example, the video content manifest can include a location to five differing video files and two differing audio files related to the same video where each of the five video files can have different bit rates, resolutions, and/or aspect ratios, etc. In addition, the video content manifest can include time-to-offset mapping for each of the video files. The audio files can contain different sample rates, different languages, and/or different sound formats, etc. The video content manifest can also include an average total bandwidth for each media file. Each video file identified within the video content manifest can be broken up into manageable segments as discussed above.

At 106, client 101 can request a first segment of the video based on client capabilities. For example, client capabilities such as client connection speed, CPU usage, memory usage, power consumption, etc. can be detected by the client and used to select a video file among a set of video files that maximizes both reliability and quality. At 108, server 103 can send a first segment of the video based on the client request.

During playback of the video stream, at 110, client capabilities can be monitored. At 112, a second segment of the video can be requested by client 101 based on the monitoring. For example, if client capabilities change such that the client can no longer process segments of the video with enough speed to offer continuous playback, a lower bit rate stream can be selected to assure that video playback is not interrupted. Alternatively, if client capabilities change such that the client has more bandwidth available to process a video stream, a higher bit rate or higher quality stream can be selected to offer the client the highest quality stream they are capable of viewing. It can be appreciated that client 101 can dynamically select a different stream in the middle of a segment and is not required to switch streams in between segments as depicted in FIG. 1. At 114, the server can send the second segment of the video based on the client request at 112.

FIG. 4A is a graphical representation of elements of an illustrative manifest. The server 103 can provide a manifest of the form depicted to the client 101, e.g., at 104 in FIG. 1. The manifest includes the following types of elements: Presentation, MediaInterval, MediaGroup, Media, Media-Header, and MediaIndex. In FIG. 4A, the presentation element (Presentation) is the root of the manifest. There is one presentation element per manifest. The video requested by the client at 102 can be associated with the presentation element.

MediaInterval elements are sub-elements of the presentation element. MediaInterval Elements are used to describe sections of the presentation temporally. MediaInterval Elements may be ordered by their start time. A MediaInterval element can include one or more MediaGroup elements.

A MediaGroup element is a container element for one or more media files, streams or feeds that originate from the same source material. For example, video files with different bitrates and/or resolution would be in the same Media Group. Audio files with different sample rates and/or number of channels would be in the same MediaGroup. Audio files in different languages would be in different MediaGroups.

The Media element is a sub-element of the MediaGroup element. The Media element is used to describe one media file, stream, or feed (referred to herein as a "media file" or "media stream" for convenience). While each MediaGroup in FIG. 4A includes only one Media element for convenience, a MediaGroup can have more than one media element. In one implementation, a client can switch between media elements of a media group without causing a discontinuity. A Media element can include a MediaHeader element and a MediaIndex element.

The MediaHeader element is used to describe setup data for the media file (e.g., a video file or audio file). The MediaIndex element contains information about a seek index for the media file. This information includes the time-to-byte offset map for the media file. In implementations of this disclosure, the Media element further contains a SeekedIndexList, as more fully described below.

FIG. 4B depicts a sample manifest in XML format consistent with the format described with respect to FIG. 4A. In FIG. 4B, the presentation is associated with two video files (or streams) and one audio file (or stream).

FIG. 4C depicts another sample manifest in XML format consistent with the format described with respect to FIG. 4A. In FIG. 4C, the presentation is association with four video files (or streams) and two audio files (or streams).

Figure 5A:
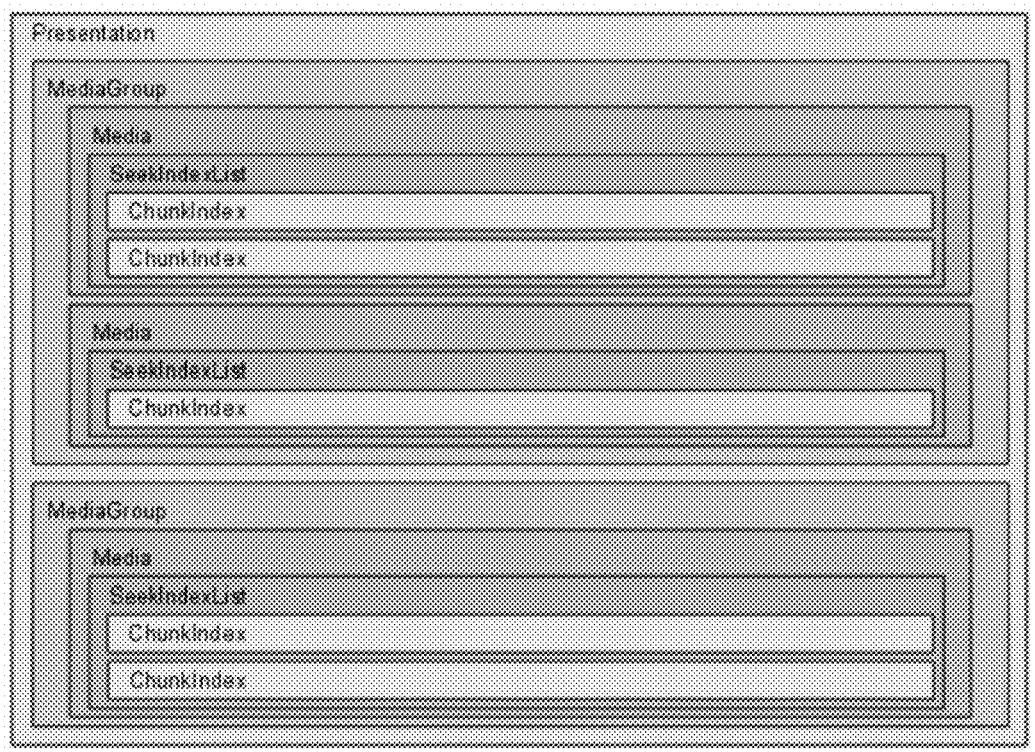
FIG. 5A a graphical representation of elements of an illustrative manifest in accordance with an implementation of this disclosure.

FIG. 5A depicts a graphical representation of elements of an illustrative manifest in accordance with an implementation of this disclosure. In FIG. 5A, the Media element further includes a SeekIndexList element. The SeekIndexList element contains information about a time-to-byte-offset map for the media file described by the Media element. The SeekIndexList includes one or more ChunkIndex elements (or IndexChunk elements). Each ChunkIndex element contains a contiguous chunk of the time-to-byte offset map.

FIG. 5B depicts a sample manifest in XML format consistent with the format described with respect to FIG. 5A. In FIG. 5B, the video associated with the manifest is the same as the video associated with the manifest of FIG. 4C. In FIG. 5B, the presentation is association with four video files (or streams) and two audio files (or streams).

It shall be appreciated that while the elements names above are used in this disclosure, other names may be used to refer to the same or similarly functioning elements without departing from embodiments of this disclosure. For example, a ChunkIndex element may be referred to as an IndexChunk element, or some other name, in a different implementation and still remain within the scope of this disclosure. As another example, the SeekIndexList element may be named MediaIndex, as understood with reference to FIG. 5B, or some other name in a different implementation and still remain within the scope of this disclosure.

Figure 2:
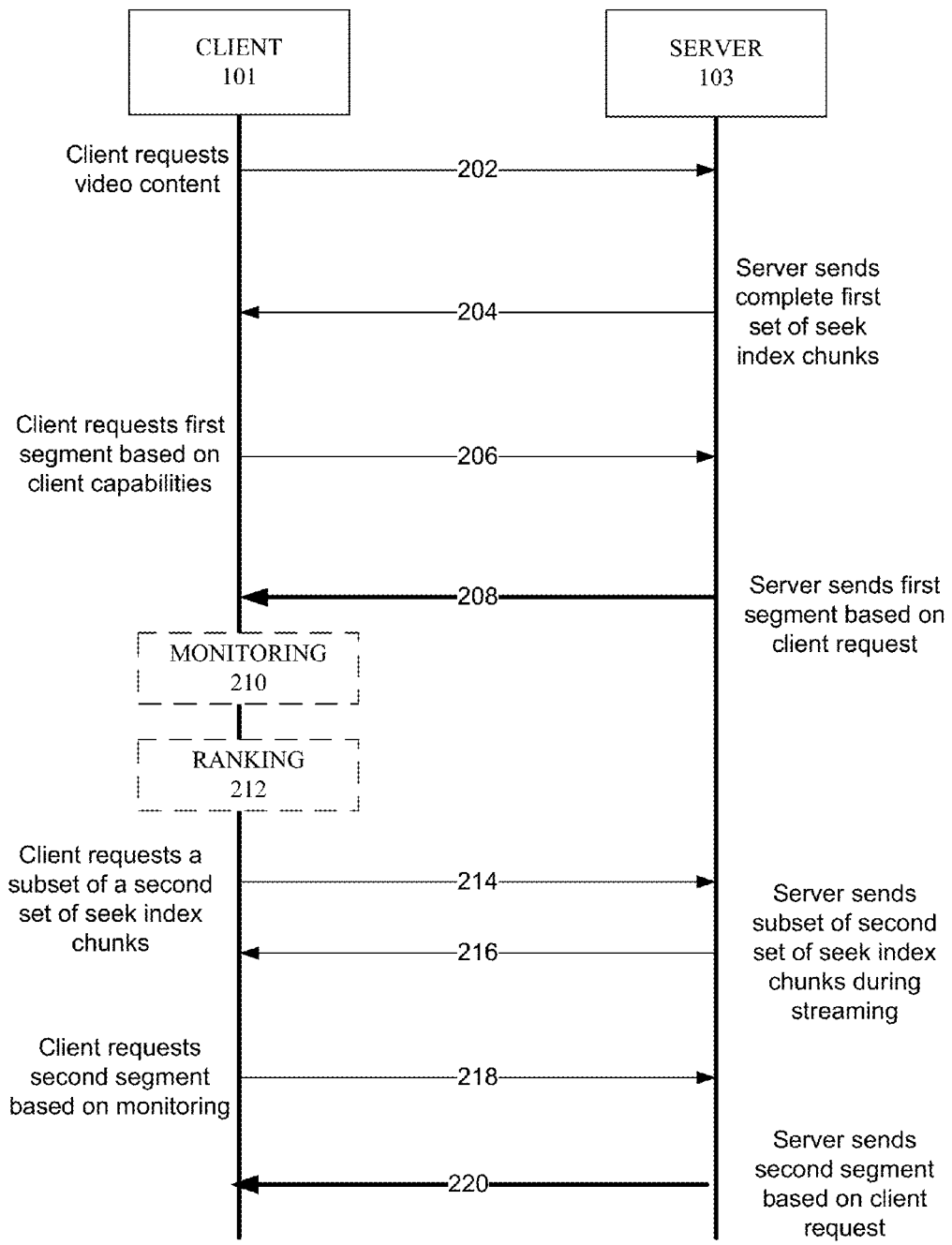
FIG. 2 illustrates an example flow diagram of adaptive streaming including downloading time-to-offset mapping in chunks in accordance with implementations of this disclosure.

Referring now to FIG. 2, there is illustrated an example flow diagram of adaptive streaming including downloading time-to-offset mapping in chunks in accordance with implementations of this disclosure. At 202, client 101 can request video content from server 103. At 204, Server 103 can send a complete first set of seek index chunks to client 101. For example, the first seek index chunk for every available stream can be sent to client 101 at 204. For example, referring to FIG. 5C, the index chunks associated with the highlighted IndexChunk elements could be sent to client 101 at 204. FIG. 5C depicts the sample manifest of FIG. 5B, but with specific elements highlighted for ease of description.

At 206, client can request a first segment of a video stream based on the first set of seek index chunks and client capabilities. For example, using the first set of index chunks, client 101 can determine the highest quality video capable of being played by client 101 for the first segment of the video.

At 208, server 103 can send the first segment of the video to the client based on the client request at 206. During playback of the video stream, at 210, client capabilities can be monitored for changing conditions. At 212, index chunks within a second set of seek index chunks can be ranked for relevance. For example, referring to FIG. 5D, the chunks identified by the highlighted elements could be ranked for relevance. FIG. 5D depicts the sample manifest of FIG. 5B, but with specific elements highlighted for ease of description. As another example, seek index chunks associated with streams that have an average bandwidth that is likely never to play well on the client based on the client capabilities can have a lower rank than seek index chunks associated with streams that are more likely to be utilized by client 101. For example, referring back to FIG. 5D, the media having an id of "3" has an average bandwidth of "1002". If the client capabilities are such that this media is unlikely to play well on the client because of, for example, a maximum network connection speed, the index chunk associated with "<IndexChunk start="600.000" end="1200.000" range="526046457-526057257"/>" can be assigned a lower rank than other index chunk. The other index chunk may be, for example, an index chunk associated with "<IndexChunk start="600.000" end="1200.000" range="394827744-394838544"/>", which is associated with the media having an id of "2" and a bandwidth of "752".

At 214, client 101 can request a subset of a second set of seek index chunks based on the ranking at 212. For example, if at 212 the ranking determines that only two of five streams are likely to be used by client 101 based on client capabilities, then at 214, a second set of seek index chunks containing seek index chunks related to only two of the five streams can be downloaded.

At 216, server 103 can send a second set of seek index chunks, while server 103 is streaming the first segment to client 101, based on the request at 214. At 218, client 101 can request a second segment of the video based on the monitoring at 210 and the second set of seek index chunks received at 216. At 220, server 103 can send the second segment of the video based on the client request at 218.

Referring now to FIG. 3A, there is illustrated a chart depicting example download times of setup data for the media referred to in FIG. 4C. In the example, there are four possible video streams and two possible audio streams denoted by Video 1, Video 2, Video 3, Video 4, Audio 1, and Audio 2 for ease of description. Video 1 corresponds to the media item identified in the manifest of FIG. 4C as having MediaInterval id=0, MediaGroup id=0, and Media id=0. Video 2 corresponds to the media item identified in the manifest of FIG. 3A as having MediaInterval id=0, MediaGroup id=0, and Media id=1. Audio 1 corresponds to the media item identified in the manifest of FIG. 4C as having MediaInterval id=0, MediaGroup id=1, and Media id=11, and so forth.

In FIG. 3A, each file or stream has both a header (identified by MediaHeader in FIG. 4C) and a seek index (identified by MediaIndex in FIG. 4C) associated with the stream that a client downloads and uses to select a stream. The second column in FIG. 3A lists in "Bytes" the size of each of the headers and seek indices that the client can download. The remaining columns are labeled based on a client connection speed and give the estimated time to download each header and index based on the size of the header or index and the connection speed. For example, if a client has a connection speed of 250 Kbps, it will take about 2.473 seconds to download the entirety of the seek index associated with Video 1 that is 77,275 bytes. The total time to download the headers and full seek indices associated with the four video streams and two audio streams is over 11 seconds at a 250 Kbps connection speed. In a system where a client must receive full seek indices for every video stream associated with a presentation prior to selecting an appropriate stream, the time it takes to download a full set of seek indices can delay the start of streaming the video.

Referring now to FIG. 3B, there is illustrated a chart depicting example download times of setup data for the media referred to in FIG. 5B in accordance with implementations of this disclosure. Recall that the video associated with the manifest depicted in FIG. 5B is the same as the video associated with the manifest of FIG. 4C. In this example chart, the same four video streams and two audio streams depicted in FIG. 3A are shown. Instead of downloading the entirety of the seek index associated with each stream, a first chunk of the seek index associated with each stream is downloaded. The size in "Bytes" associated with each seek index chunk versus the entirety of each seek index from FIG. 3A is readily apparent. In this example, downloading the first index chunk for each stream reduces the required download time using a 250 Kbps connection speed to 1.802 seconds. Thus, in this example, a client that downloads chunks of seek indices can start video playback almost ten seconds sooner than a client that must download the entirety of every seek index.

Figure 6:
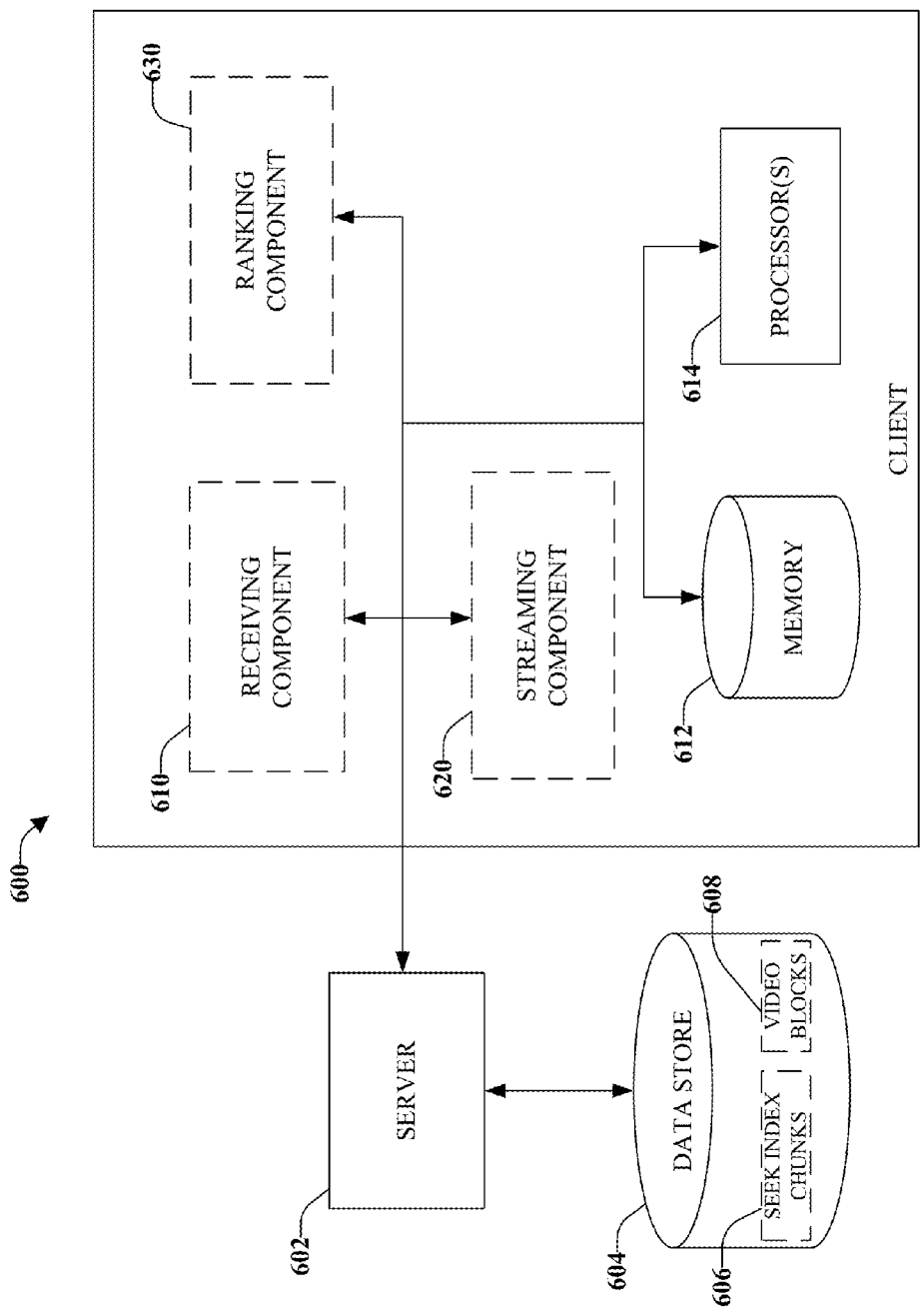
FIG. 6 illustrates a high-level functional block diagram of an example system using chunked time-to-offset mapping in adaptive streaming in accordance with implementations of this disclosure.

Referring now to FIG. 6, there is illustrated a high-level functional block diagram of an example system 600 using chunked time-to-offset mapping in adaptive streaming in accordance with implementations of this disclosure. A receiving component 610 can receive a first set of seek index chunks associated with a first set of video blocks, wherein the video blocks are encoded with different video characteristics, e.g., differing bit rates, resolutions, aspect ratios, width, height, and/or sample rate, etc. For example, client 600 can receive the first set of seek index chunks from server 602 where server 602 has access to data store 604 containing seek index chunks 606 and video blocks 608.

A streaming component 620 can dynamically select to stream one of the video blocks among the first set of video blocks as a function of the first set of seek index chunks and client capabilities. For example, client capabilities can include client connection speed, CPU usage, memory usage, or client resource monitors.

A ranking component 630 can rank index chunks within a second set of seek index chunks for relevance based on client capabilities. This ranking can be based on, for example, analysis of information contained in a manifest associated with the requested presentation. Based on the ranking, the receiving component 610 can receive a second set of seek index chunks, e.g., during streaming of a first segment of a video file. The second set of seek index chunks can be a subset of the available second set of seek index chunks in the data store selected based on the ranking.

In one implementation, streaming component 620, upon completion of streaming one of the video blocks among the first set of video blocks, can dynamically select a video block associated with the subset of the second set of seek index chunks as a function of the subset of the second set of seek index chunks and client capabilities.

In an implementation, ranking component 630 can rank seek index chunks within a third set of seek index chunks for relevance based on client capabilities. Receiving component 610 can receive during streaming the third set of seek index chunks, or a subset thereof based on the ranking. It can be appreciated that streaming component 620 can continue to dynamically select one of the video blocks among an Nth (N is an integer) set of video blocks to stream.

Figure 7:
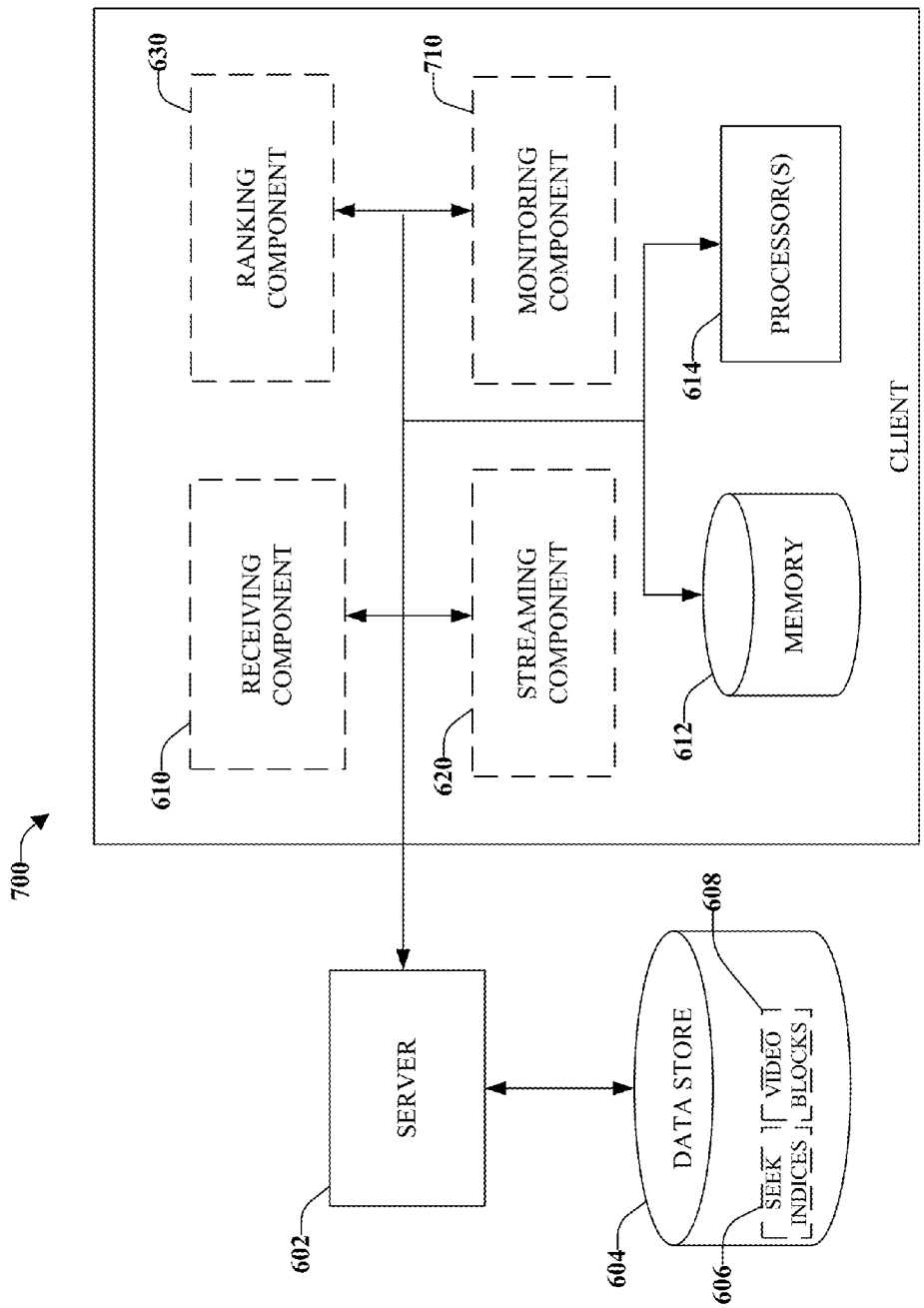
FIG. 7 illustrates a high-level functional block diagram of an example system using chunked time-to-offset mapping in adaptive streaming including a monitoring component in accordance with implementations of this disclosure.

Referring now to FIG. 7, there is illustrated a high-level functional block diagram of an example system using chunked time-to-offset mapping in adaptive streaming including a monitoring component in accordance with implementations of this disclosure. Monitoring component 710 can dynamically monitor client capabilities such as client connection speed, usage associated with client memory 612, usage associated with client processor(s) 614, and other resource monitors uniquely pertinent to the client. Streaming component 620 can dynamically select to stream one of the video files, e.g., beginning at a new key frame, based on the dynamic monitoring. For example, if monitoring component 710 detects a drop in client capabilities (e.g., a drop in client connection speed), streaming component 630 can dynamically select a new file (e.g., a lower bit rate video file) to stream, beginning at the next key frame, based on the dynamic monitoring. As an alternate example, if monitoring component 710 detects an increase in available processor(s) 614 resources (e.g., because a separate previously open application on the client device was closed), streaming component 620 can dynamically select a new media file associated with the presentation (e.g., a higher quality video file) to stream beginning at the next key frame.

In one implementation, ranking component 630 can dynamically update ranks based on the dynamic monitoring. For example, if monitoring component 710 detects a drop in client capabilities (e.g., a drop in client connection speed) or an increase in available resources (e.g., a separate previously open application on the client device is closed), ranking component 630 can dynamically update the ranks associated with seek index chunks. It can be appreciated that seek index chunks that were previously excluded may become included based on changing client capabilities.

In one implementation, receiving component 610 can dynamically alter the subset of seek index chunks it receives from server 602 based on the dynamic update to ranks.

FIGS. 8-11 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methods, as relevant. Furthermore, as used herein, video blocks can be frames of a video file encoded with different video characteristics, e.g., different bit rate, resolution, aspect ratio, width, height, and/or sample rate, etc. In one implementation, the video block is a chunk. In one implementation, the chunk is determined using Group of Pictures (GOP) boundaries where each GOP begins with a key frame so as to have no dependencies on past or future GOPs.

Figure 8:
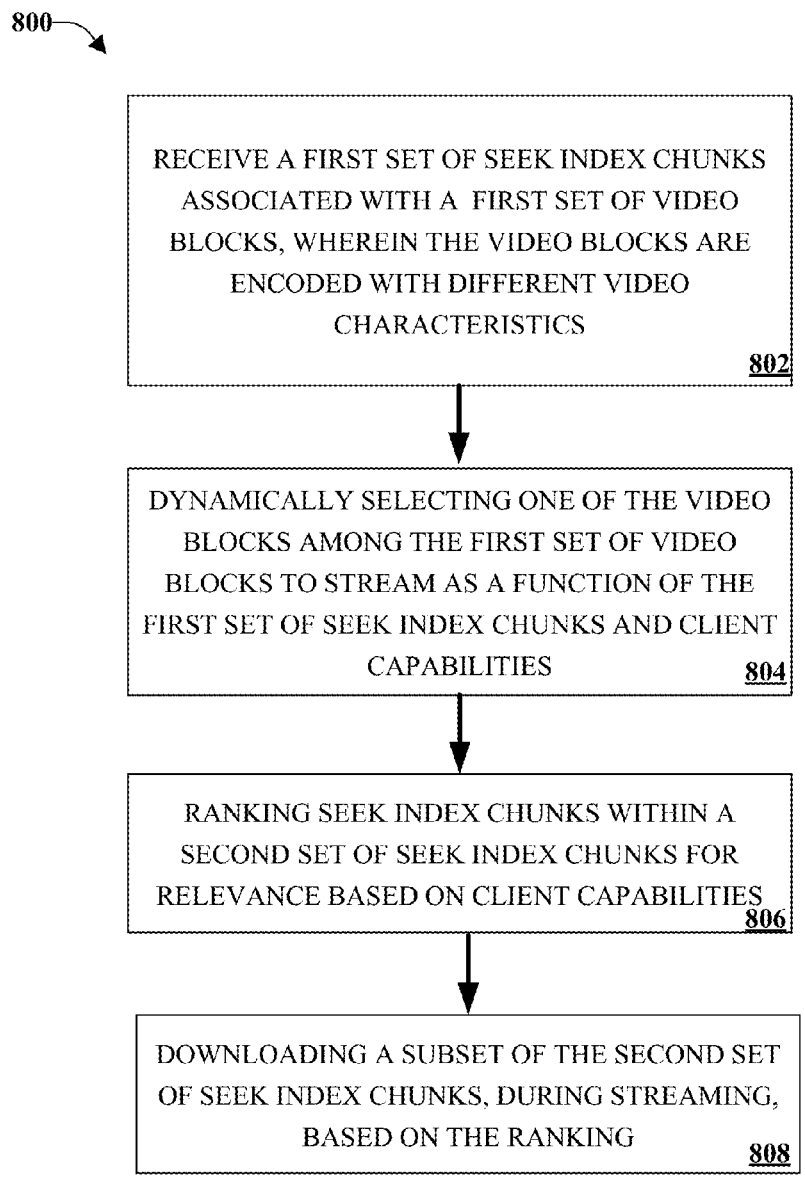
FIG. 8 illustrates an example flow diagram method for using chunked time-to-offset mapping in adaptive streaming in accordance with implementations of this disclosure.

FIG. 8 illustrates an example flow diagram method for using chunked time-to-offset mapping in adaptive streaming in accordance with implementations of this disclosure. At 802, a first set of seek index chunks associated with a first set of video blocks can be received (e.g., by a receiving component 610) wherein the video blocks are encoded with different video characteristics. At 804, one of the video blocks among the first set of video blocks can be dynamically selected (e.g., by a streaming component 620) to stream as a function of the first set of seek index chunks and client capabilities.

At 806, seek index chunks within a second set of seek index chunks can be ranked (e.g., by a ranking component 630) for relevance based on client capabilities. At 808, a subset of the second set of seek index chunks can be received (e.g., by a receiving component 610), e.g., during streaming of the video block, based on the ranking.

Figure 9:
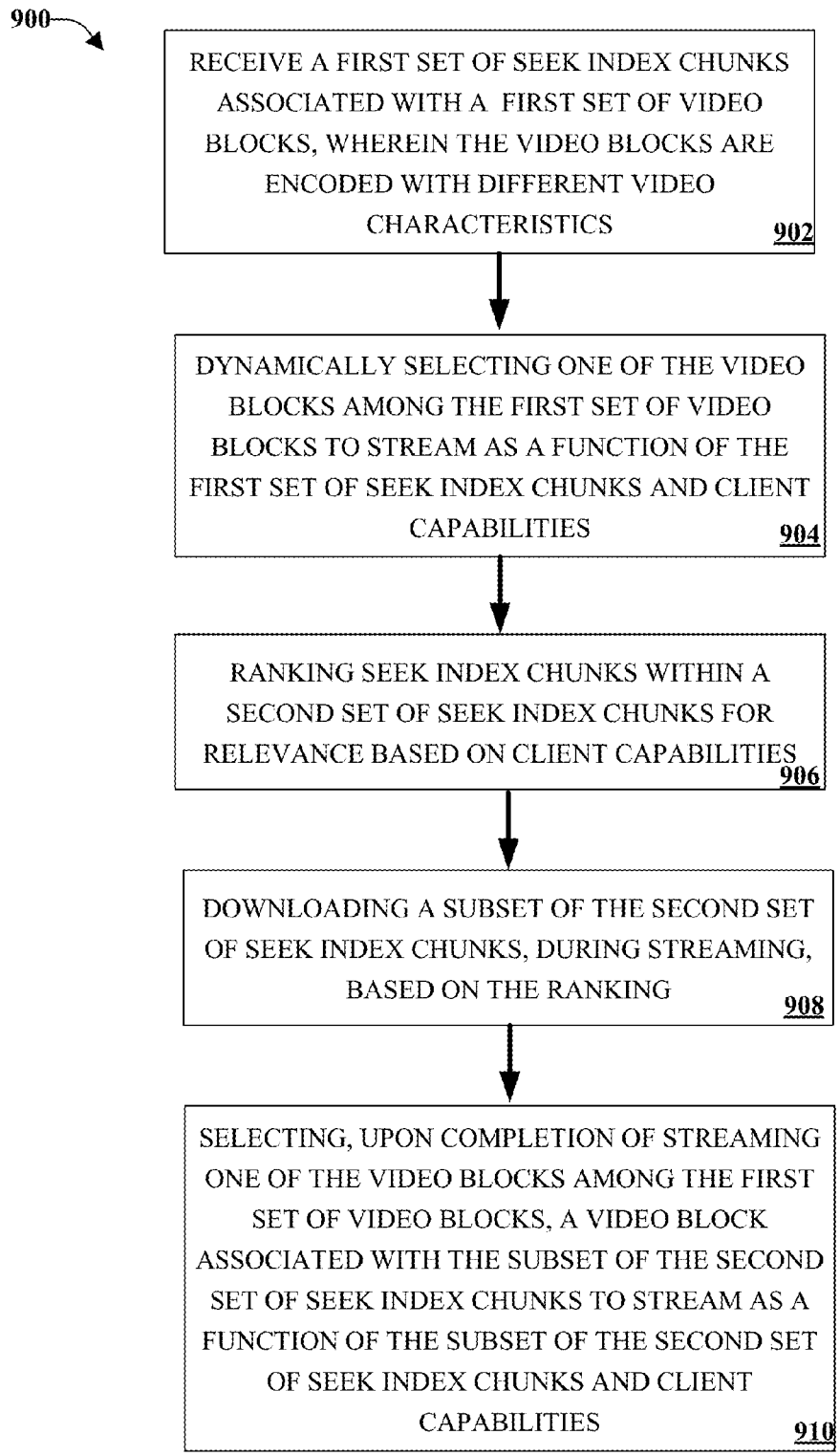
FIG. 9 illustrates an example flow diagram method for using chunked time-to-offset mapping in adaptive streaming in accordance with implementations of this disclosure.

FIG. 9 illustrates an example flow diagram method for using chunked time-to-offset mapping in adaptive streaming in accordance with implementations of this disclosure. At 902, a first set of seek index chunks associated with a first set of video blocks can be received (e.g., by a receiving component 610) wherein the video blocks are encoded with different video characteristics. At 904, one of the video blocks among the first set of video blocks can be dynamically selected (e.g., by a streaming component 620) to stream as a function of the first set of seek index chunks and client capabilities.

At 906, seek index chunks within a second set of seek index chunks can be ranked (e.g., by a ranking component 630) for relevance based on previously determined, current or updated client capabilities. At 908, a subset of the second set of seek index chunks can be received (e.g., by a receiving component 610), during streaming, based on the ranking. At 910, upon completion of streaming one of the video blocks among the first set of video blocks, a video block associated with the subset of the second set of seek index chunks can be dynamically selected (e.g., by a streaming component 620) to stream as a function of the subset of the second set of seek index chunks and client capabilities.

Figure 10:
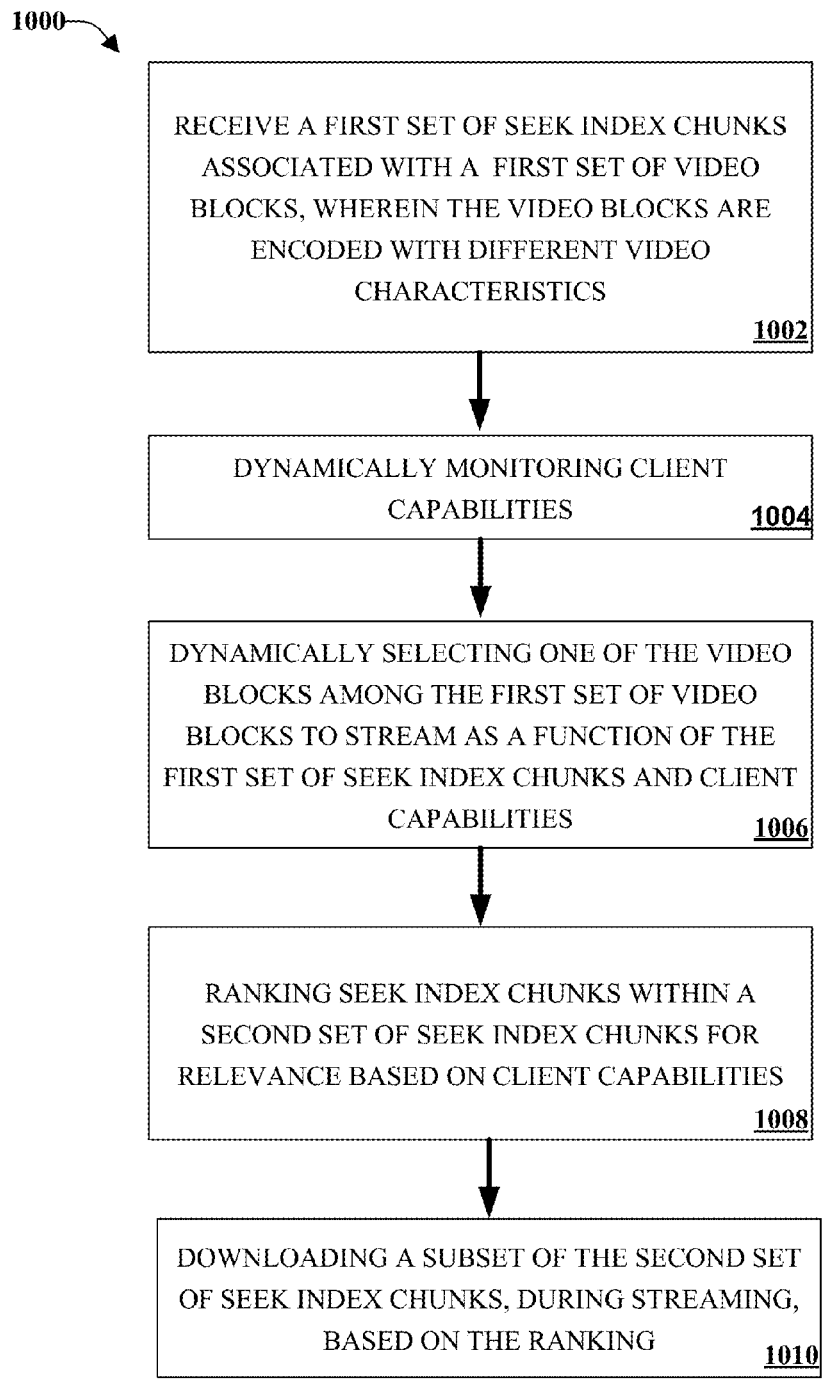
FIG. 10 illustrates an example flow diagram method for using chunked time-to-offset mapping in adaptive streaming including dynamically monitoring client capabilities in accordance with implementations of this disclosure.

FIG. 10 illustrates an example flow diagram method for using chunked time-to-offset mapping in adaptive streaming including dynamically monitoring client capabilities in accordance with implementations of this disclosure. At 1002, a first set of seek index chunks associated with a first set of video blocks can be received (e.g., by a receiving component 610) wherein the video blocks are encoded with different video characteristics. At 1004, client capabilities can be determined (e.g., via dynamic monitoring by a monitoring component 710). At 1006, one of the video blocks among the first set of video blocks can be dynamically selected (e.g., by a streaming component 620) to stream as a function of the first set of seek index chunks and client capabilities.

At 1008, seek index chunks within a second set of seek index chunks can be ranked (e.g., by a ranking component 630) for relevance based on client capabilities. At 1010, a subset of the second set of seek index chunks can be received (e.g., by a receiving component 610), during streaming, based on the ranking.

Figure 11:
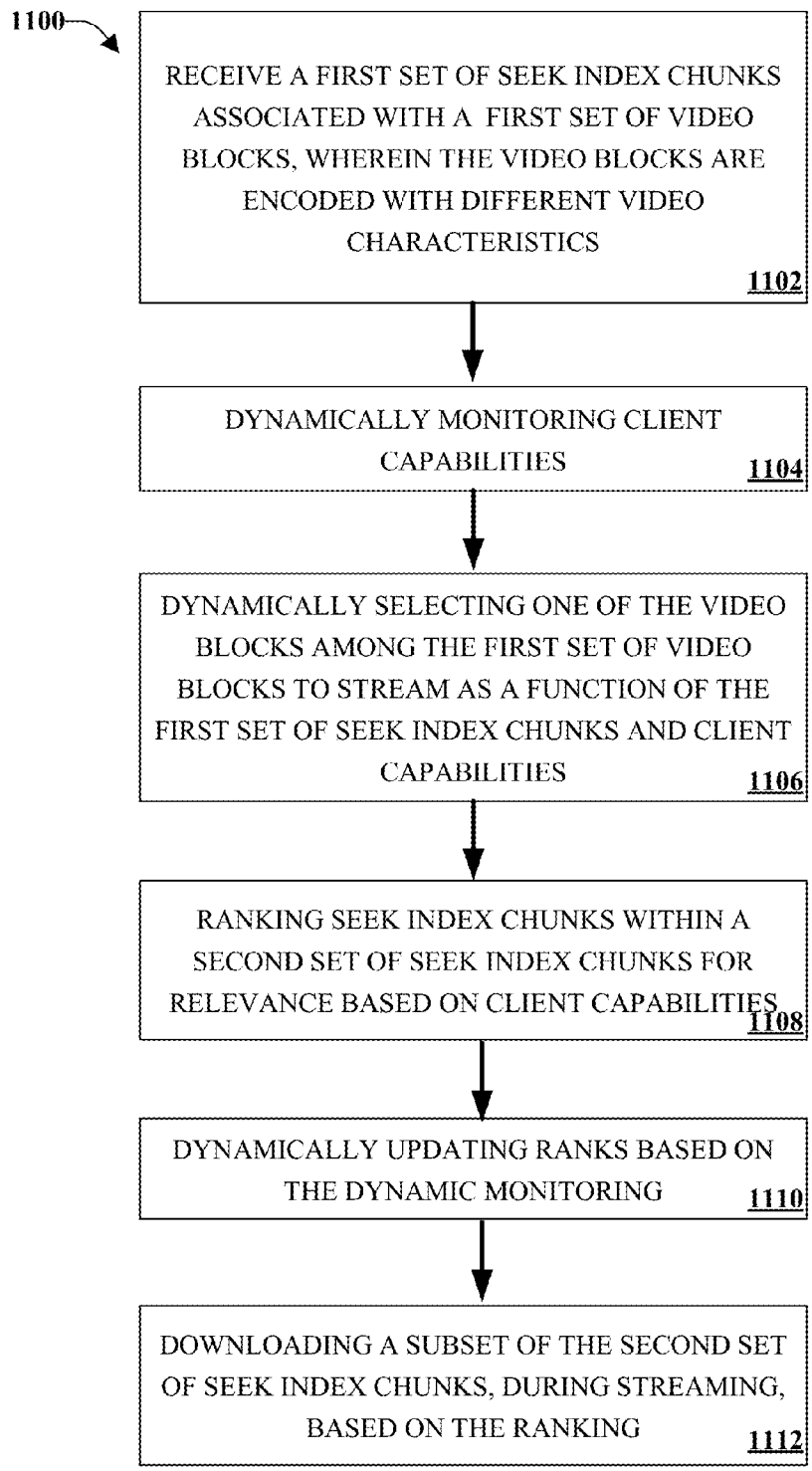
FIG. 11 illustrates an example flow diagram method for using chunked time-to-offset mapping in adaptive streaming including dynamically updating ranks in accordance with implementations of this disclosure.

FIG. 11 illustrates an example flow diagram method for using chunked time-to-offset mapping in adaptive streaming including dynamically updating ranks in accordance with implementations of this disclosure. At 1102, a first set of seek index chunks associated with a first set of video blocks can be received (e.g., by a receiving component 610) wherein the video blocks are encoded with different video characteristics. At 1104, client capabilities can be dynamically monitored (e.g., by a monitoring component 710). At 1106, one of the video blocks among the first set of video blocks can be dynamically selected (e.g., by a streaming component 620) to stream as a function of the first set of seek index chunks and client capabilities.

At 1108, seek index chunks within a second set of seek index chunks can be ranked (e.g., by a ranking component 630) for relevance based on client capabilities. At 1110, ranks can be dynamically updated (e.g., by a ranking component 630) based on the dynamic monitoring. At 1112, a subset of the second set of seek index chunks can be received (e.g., by a receiving component 610), during streaming, based on the dynamically updated ranking.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 12:
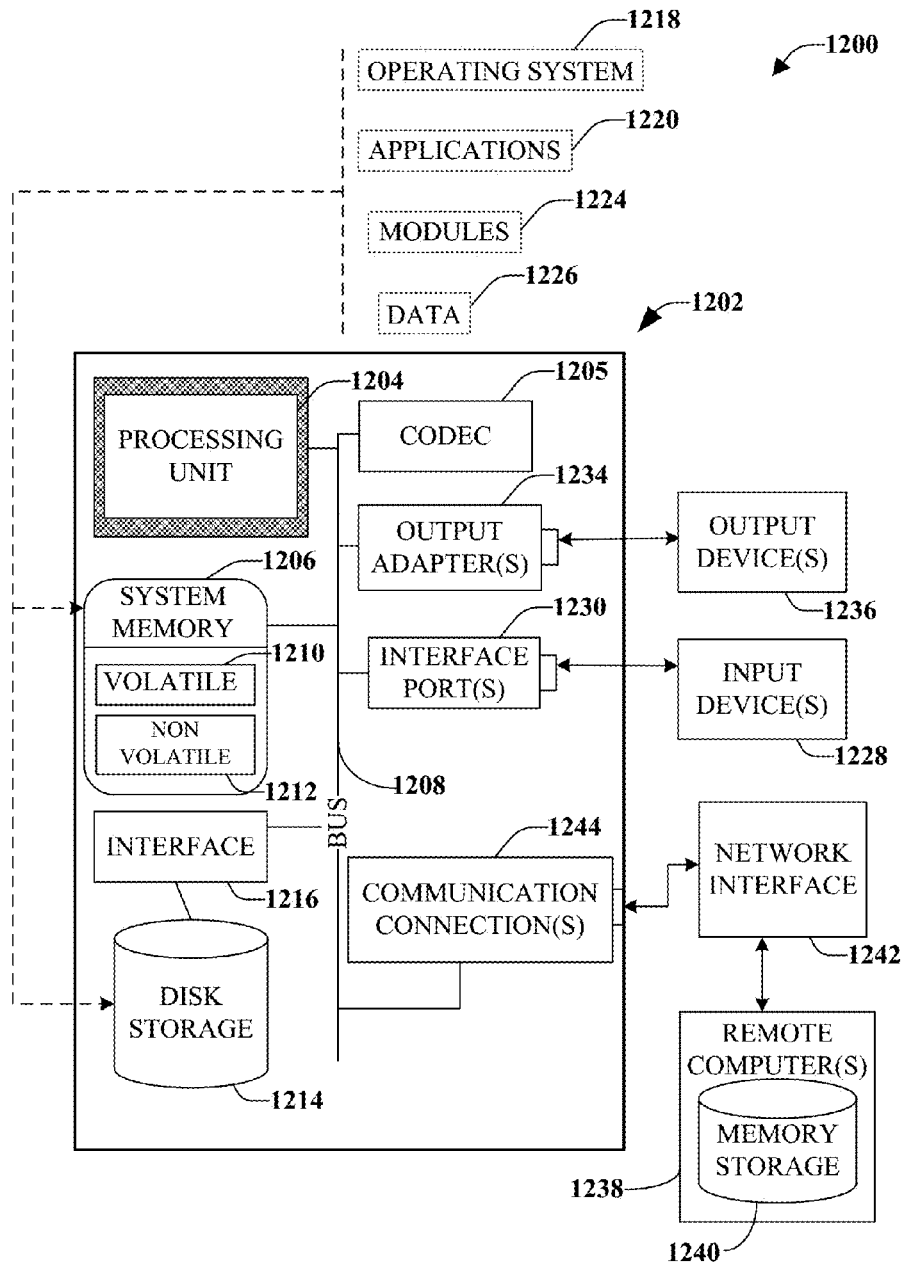
FIG. 12 illustrates an example block diagram of a computer operable to execute the disclosed architecture in accordance with implementations of this disclosure.

With reference to FIG. 12, a suitable environment 1200 for implementing various aspects of the claimed subject matter includes a computer 1202. The computer 1202 includes a processing unit 1204, a system memory 1206, a codec 1205, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204. The codec 1205 can, depending on the context, encode and/or decode media files, or segments thereof, associated with a presentation.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1206 includes volatile memory 1210 and non-volatile memory 1212. The basic input/output system (BIOS), containing the basic routines to transfer information between elements within the computer 1202, such as during start-up, is stored in non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), or flash memory. Volatile memory 1210 includes random access memory (RAM), which acts as external cache memory. According to present aspects, the volatile memory may store the write operation retry logic (not shown in FIG. 12) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 1202 may also include removable/non-removable, volatile/non-volatile computer storage media. FIG. 12 illustrates, for example, a disk storage 1214. Disk storage 1214 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1214 to the system bus 1208, a removable or non-removable interface is typically used, such as interface 1216.

It is to be appreciated that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer system 1202. Applications 1220 take advantage of the management of resources by operating system 1218 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s) 1228. Thus, for example, a USB port may be used to provide input to computer 1202 and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

Figure 13:
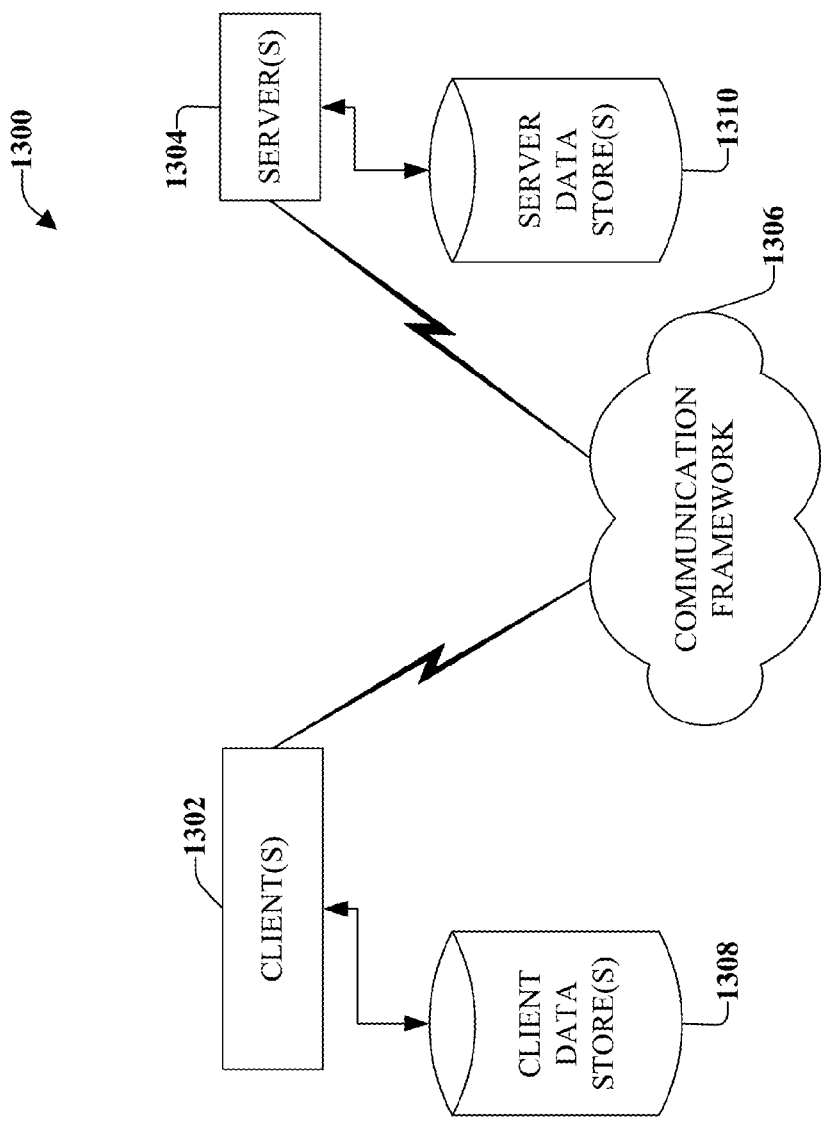
FIG. 13 illustrates an example schematic block diagram for a computing environment in accordance with implementations of this disclosure.

Referring now to FIG. 13, there is illustrated a schematic block diagram of a computing environment 1300 in accordance with the subject specification. The system 1300 includes one or more client(s) 1302, which can include an application or a system that accesses a service on the server 1304. The client(s) 1302 can be hardware and/or software (e.g., threads, processes, computing devices). The client(s) 1302 can house cookie(s), metadata, and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform, for example, sending a video manifest, monitoring client capabilities, breaking down seek indices into chunks, etc. in accordance with the subject disclosure. One possible communication between a client 1302 and a server 1304 can be in the form of a data packet adapted to be transmitted between two or more computer processes where the data packet contains, for example, portions of a video stream. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
transmitting a manifest to a client, wherein the manifest identifies a presentation available for streaming by the client, and wherein the manifest comprises:
   a plurality of media elements identifying media files, wherein each media file is a different audio or video version of the presentation;
   a media index element for each media element, wherein the media index element contains information about a seek index associated with the identified media file; and
   a plurality of seek index chunk elements for each media index element, wherein the plurality of seek index chunk elements for each media index element identifies chunks of the corresponding seek index, wherein each media index element comprises a first seek index chunk element associated with a first seek index chunk and a second seek index chunk element associated with a second seek index chunk; and
transmitting the first seek index chunk for all media index elements in the manifest before transmitting a second seek index chunk for any of the media index elements.

2. The method of claim 1, comprising:
transmitting the first seek index chunk for all media index elements in the manifest;
receiving a request from the client to transmit a subset of the second seek index chunk elements; and
transmitting the subset of the second seek index chunk elements.

3. The method of claim 1, further comprising:
transmitting the first seek index chunk for all media index elements in the manifest;
receiving a request for a first segment of a media file;
transmitting a subset of the second seek index chunk elements; and
transmitting the subset of the second seek index chunk elements while transmitting the first segment of the media file.

4. A method comprising:
requesting a presentation for streaming;
receiving a manifest associated with the presentation, wherein the manifest comprises:
   a plurality of media elements identifying media files, wherein each media file is a different audio or video version of the presentation;
   a media index element for each media element, wherein the media index element contains information about a seek index associated with the identified media file, and wherein each media index element comprises a first seek index chunk element associated with a first seek index chunk and a second seek index chunk element associated with a second seek index chunk; and
   a plurality of seek index chunk elements for each media index element, wherein the plurality of seek index chunk elements for each media index element identifies chunks of the corresponding seek index; and
receiving the first seek index chunk for all media index elements in the manifest before receiving a second seek index chunk for any of the media index elements.

5. The method of claim 4, further comprising:
receiving the first seek index chunk for all media index elements in the manifest;
requesting a subset of the second seek index chunk elements; and
receiving the subset of the second seek index chunk elements.

6. The method of claim 4, further comprising:
receiving the first seek index chunk for all media index elements in the manifest;
requesting a first segment of a media file based on the first seek index chunks;
requesting a subset of the second seek index chunk elements; and
receiving the subset of the second seek index chunk elements while receiving the first segment of the media file.

7. A computer system for adaptive video streaming, the system comprising:
a processor;
memory storing instructions, when executed, are configured to cause the processor to:
   transmit a manifest to a client, wherein the manifest identifies a presentation available for streaming by the client, and wherein the manifest comprises:
      a plurality of media elements identifying media files, wherein each media file is a different audio or video version of the presentation;
      a media index element for each media element, wherein the media index element contains information about a seek index associated with the identified media file; and
      a plurality of seek index chunk elements for each media index element, wherein the plurality of seek index chunk elements for each media index element identifies chunks of the corresponding seek index, and wherein each media index element comprises a first seek index chunk element associated with a first seek index chunk and a second seek index chunk element associated with a second seek index chunk; and
   transmit the first seek index chunk for all media index elements in the manifest before transmitting a second seek index chunk for any of the media index elements.

8. The computer system of claim 7, wherein the instructions are further configured to cause the processor to:
transmit the first seek index chunk for all media index elements in the manifest;
receive a request from the client to transmit a subset of the second seek index chunk elements; and
transmit the subset of the second seek index chunk elements.

9. The computer system of claim 7, wherein the instructions are further configured to cause the processor to:
transmit the first seek index chunk for all media index elements in the manifest;
receive a request for a first segment of a media file;
transmit a subset of the second seek index chunk elements; and
transmit the subset of the second seek index chunk elements while transmitting the first segment of the media file.

10. A non-transitory computer-readable storage medium storing executable computer program instructions for adaptive video streaming, the computer program instructions comprising instructions for:
- transmitting a manifest to a client, wherein the manifest identifies a presentation available for streaming by the client, and wherein the manifest comprises:
  - a plurality of media elements identifying media files, wherein each media file is a different audio or video version of the presentation;
  - a media index element for each media element, wherein the media index element contains information about a seek index associated with the identified media file; and
  - a plurality of seek index chunk elements for each media index element, wherein the plurality of seek index chunk elements for each media index element identifies chunks of the corresponding seek index, and wherein each media index element comprises a first seek index chunk element associated with a first seek index chunk and a second seek index chunk element associated with a second seek index chunk; and
- transmitting the first seek index chunk for all media index elements in the manifest before transmitting a second seek index chunk for any of the media index elements.

11. The non-transitory computer-readable storage medium of claim 10, wherein the computer instructions further comprise instructions for:
- transmitting the first seek index chunk for all media index elements in the manifest;
- receiving a request from the client to transmit a subset of the second seek index chunk elements; and
- transmitting the subset of the second seek index chunk elements.

12. The non-transitory computer-readable storage medium of claim 10, wherein the computer instructions further comprise instructions for:
- transmitting the first seek index chunk for all media index elements in the manifest;
- receiving a request for a first segment of a media file;
- transmitting a subset of the second seek index chunk elements; and
- transmitting the subset of the second seek index chunk elements while transmitting the first segment of the media file.

* * * * *